US011897352B2

(12) United States Patent
Raikh

(10) Patent No.: US 11,897,352 B2
(45) Date of Patent: Feb. 13, 2024

(54) PLUG INLET FOR STORING ELECTRICAL VEHICLE PLUG

(71) Applicant: Solaredge Technologies Ltd., Herzeliya (IL)

(72) Inventor: Michael Raikh, Rishon LeZion (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/874,539

(22) Filed: Jul. 27, 2022

(65) Prior Publication Data

US 2022/0363152 A1 Nov. 17, 2022

Related U.S. Application Data

(63) Continuation of application No. 17/119,420, filed on Dec. 11, 2020, now Pat. No. 11,440,421, which is a continuation of application No. 16/405,633, filed on May 7, 2019, now Pat. No. 10,864,823.

(60) Provisional application No. 62/670,935, filed on May 14, 2018.

(51) Int. Cl.
*B60L 53/16* (2019.01)
*B60L 53/10* (2019.01)
*H01R 13/62* (2006.01)
*H01R 13/627* (2006.01)
*H01R 13/629* (2006.01)

(52) U.S. Cl.
CPC .......... *B60L 53/11* (2019.02); *H01R 13/6205* (2013.01); *H01R 13/629* (2013.01); *H01R 13/6271* (2013.01); *H01R 2201/26* (2013.01)

(58) Field of Classification Search
CPC . B60L 53/16; H01R 13/6205; H01R 13/6271; H01R 13/6276; H01R 13/6277; H01R 13/6278; H01R 13/629; H01R 2201/26
USPC ......................................................... 439/310
See application file for complete search history.

(56) References Cited

U.S. PATENT DOCUMENTS

| 5,478,250 | A | 12/1995 | Hoffman |
| 8,573,994 | B2 | 11/2013 | Kiko et al. |
| 8,651,875 | B2 | 2/2014 | Ferguson et al. |
| 9,755,359 | B2 | 9/2017 | Moseke |
| 9,776,521 | B2 | 10/2017 | Lopez et al. |
| 9,806,459 | B2 | 10/2017 | Fuehrer et al. |

(Continued)

FOREIGN PATENT DOCUMENTS

| DE | 102013000557 A1 * | 7/2014 | ......... A45C 13/1069 |
| DE | 102015008761 B3 * | 11/2016 | |

(Continued)

OTHER PUBLICATIONS

Sep. 20, 2019—Extended European Search Report—EP 19172251.1.

(Continued)

*Primary Examiner* — Peter G Leigh
(74) *Attorney, Agent, or Firm* — Banner & Witcoff, Ltd.

(57) ABSTRACT

A method includes plugging a plug into a socket, wherein the plugging includes pushing the plug into the socket at least up to a point that a latch clicks into the plug and locks the plug in place. Pressing down on a lever that rotates around an axis causes the lever to be pushed down. This results in the latch moving away from the plug and unlocking the plug from the socket, to thereby allow the plug to be separated from the socket.

20 Claims, 8 Drawing Sheets

(56) References Cited

U.S. PATENT DOCUMENTS

| | | | |
|---|---|---|---|
| 9,837,762 B2 | 12/2017 | Garth | |
| 9,944,172 B2 | 4/2018 | Basavarajappa et al. | |
| 2010/0228405 A1* | 9/2010 | Morgal | B62H 3/00 701/1 |
| 2017/0047679 A1 | 2/2017 | Garth | |
| 2017/0267114 A1 | 9/2017 | Bianco et al. | |

FOREIGN PATENT DOCUMENTS

| | | | | |
|---|---|---|---|---|
| FR | 2451070 A2 | 10/1980 | | |
| FR | 2991658 A1 | 12/2013 | | |
| FR | 3014825 A1 | 6/2015 | | |
| FR | 3014826 A1 * | 6/2015 | | B60L 50/20 |
| FR | 3014832 A1 * | 6/2015 | | B60L 11/1816 |
| JP | 2015119518 A | 6/2015 | | |

OTHER PUBLICATIONS

Jan. 12, 2022—CN Office Action—CN App. No. 201910387644.3.
Aug. 22, 2023—European Search Report—EP App. No. 23172795.9.
Sep. 5, 2023—Japanese Office Action—JP App No. 2019-089719.

* cited by examiner

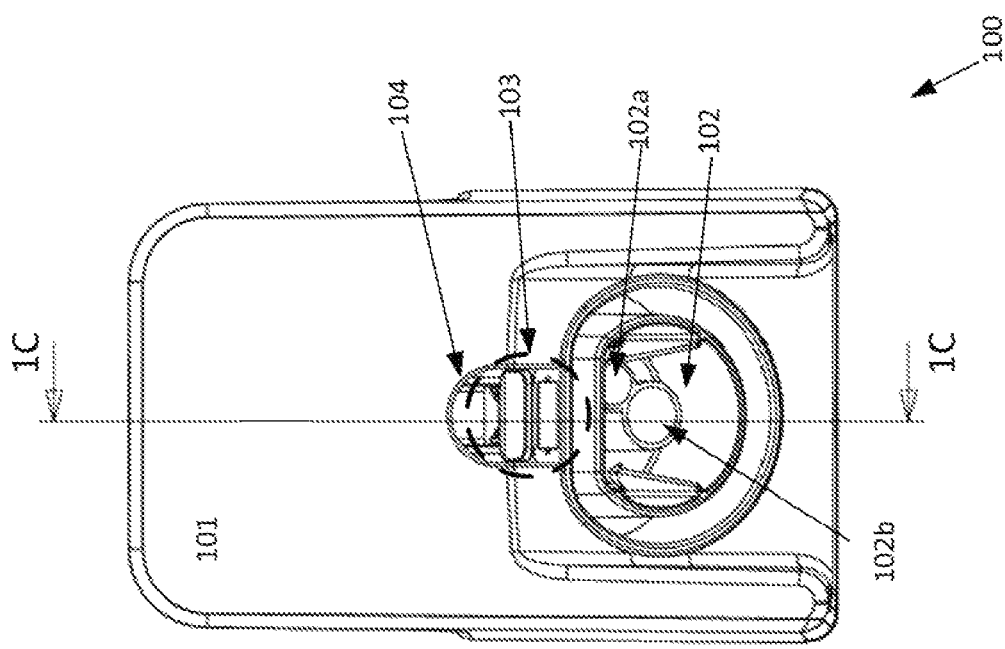
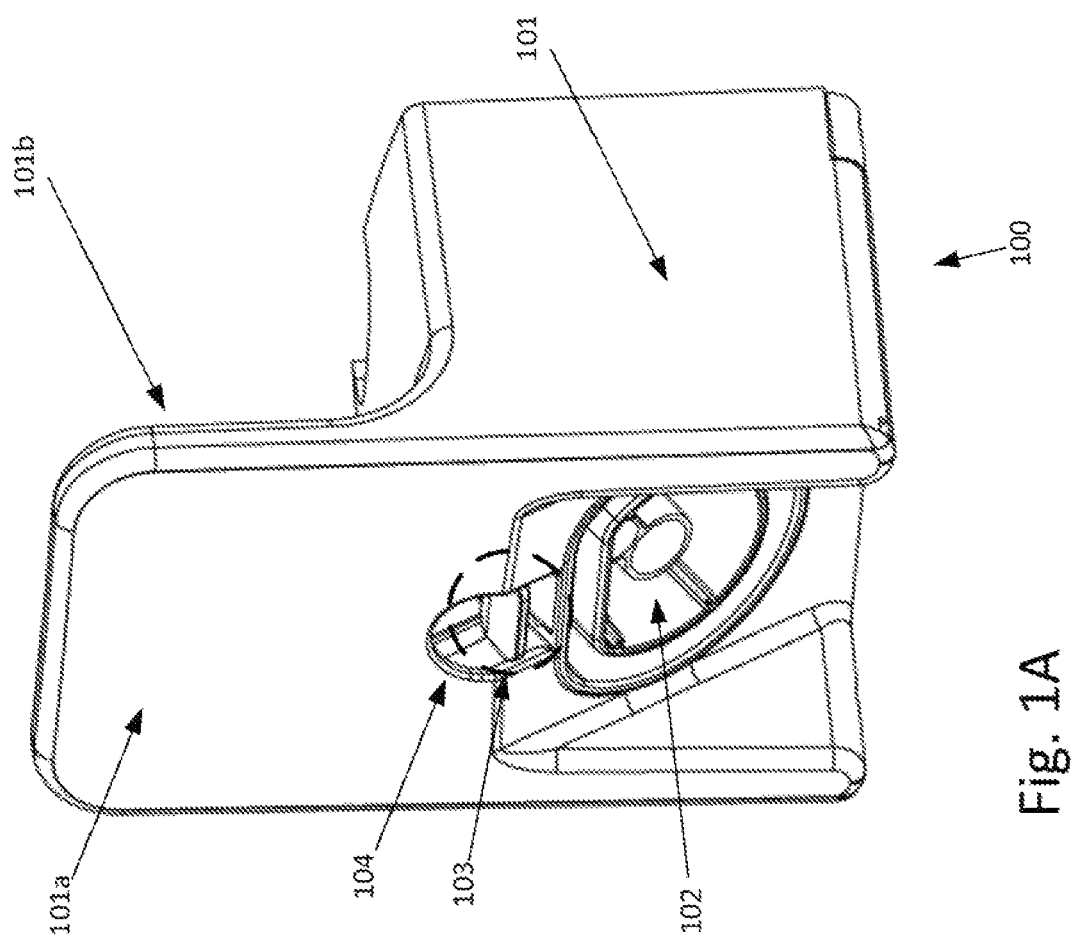

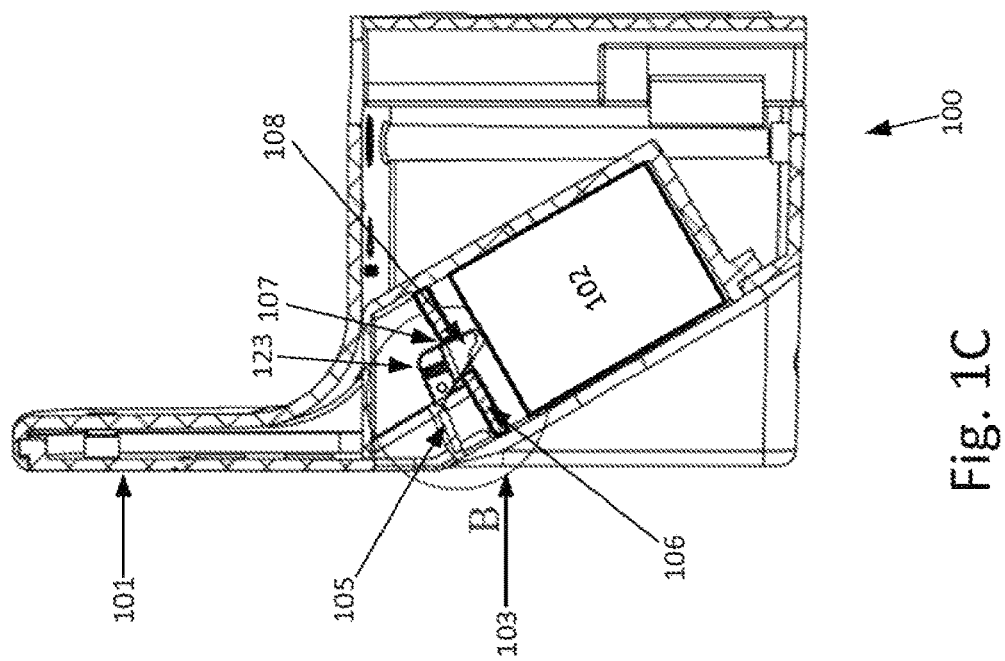

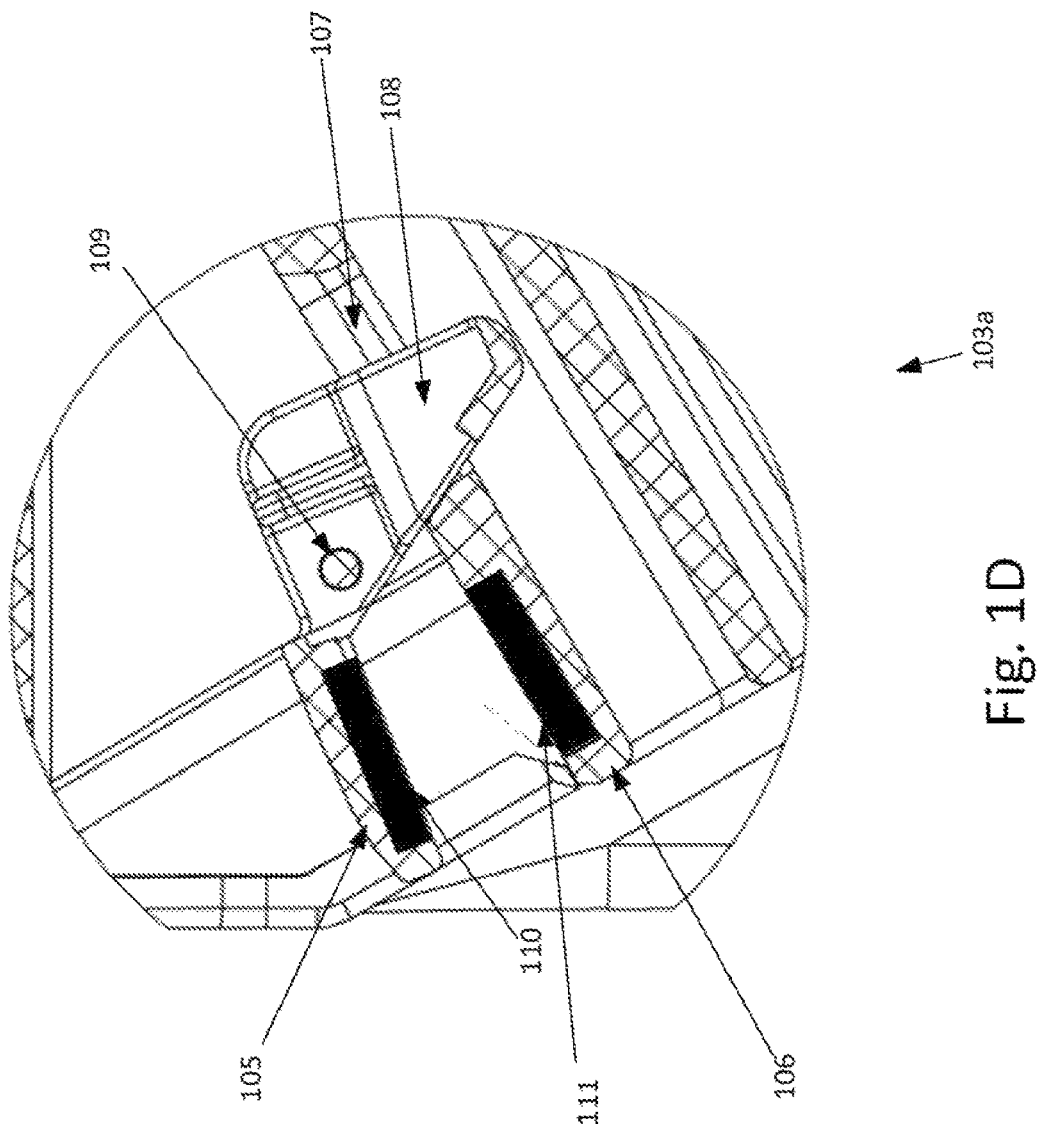

PLUG INLET FOR STORING ELECTRICAL VEHICLE PLUG

CROSS REFERENCE TO RELATED APPLICATIONS

The present application is a continuation of U.S. patent application Ser. No. 17/119,420, filed Dec. 11, 2020, which is a continuation of U.S. patent application Ser. No. 16/405,633, filed May 7, 2019, now U.S. Pat. No. 10,864,823, which claims priority to U.S. Provisional Application Ser. No. 62/670,935, filed May 14, 2018. The entire contents of these applications are incorporated herein by reference.

BACKGROUND

Electrical vehicles require an electrical connection to receive electricity from a source of electrical power, such as the electrical grid, in order to charge the vehicle to allow the vehicle to be driven a particular distance before running out of charge. As such, a plug is used to charge the vehicle, whereby the plug should be safely stored away when not being used to charge the vehicle.

It is desirable to come up with a device that can connect to an electrical vehicle charging plug when it is not being used to charge a vehicle, to thereby hold the plug in place so as to reduce wear and tear on the plug and thereby extend its useful life.

SUMMARY

The following summary is a short summary of some of the inventive concepts for illustrative purposes only, and is not intended to limit or constrain the inventions and examples in the detailed description. One skilled in the art will recognize other novel combinations and features from the detailed description.

Embodiments herein may describe a plug inlet for storing a plug such as an electrical vehicle (EV) plug. The plug inlet may be designed to be mounted on, for example, a wall, a door or a variety of other surfaces. According to some aspects, the plug inlet may be part of/mounted on a different mechanism, such as an inverter, or an EV charger. According to some aspects of the disclosure herein, the plug inlet may be designed to accommodate wrapping a cord, around the base of the plug inlet, with the cord optionally attached to a plug configured to be inserted into the plug inlet. For example, an electric vehicle charging plug may be five meters long and six centimeters in diameter. When the electric vehicle charging plug is not being used for charging a car, one way to safely store the plug may be by wrapping the cord around a plug inlet. By safely storing the cord one may prevent accidents (e.g., accidents caused by a child playing with the cord) and/or wear and tear on the plug that may occur by stepping on the cord, kicking the cord, etc.

According to some aspects, the plug inlet may be designed to lock a corresponding plug to the plug inlet. Locking the plug to the plug inlet may be done in one or more methods. One example of a method for locking a plug to a plug inlet may include inserting the plug into the plug inlet, and locking the plug to the plug inlet by inserting a prong connected to the plug inlet to a receptacle area in the plug. Inserting a prong connected to the plug inlet to a receptacle area in the plug may be done using an electro-mechanical switch, for example a solenoid. The solenoid may be housed in the plug inlet and may be configured to insert a prong into a receptacle area in the plug when a first voltage is applied to the solenoid, and remove the prong from the receptacle area when a second voltage is applied to the solenoid.

Another example mechanism for locking a plug to a corresponding plug inlet may include a click-in latch lock. The plug inlet may have a socket designed to house the plug. The plug may have a mortise designed to house a latch. The plug inlet may have a lever with a handle on a first side and a latch on a second side. The latch may be designed to fit into the mortise of the plug. The lever may be designed to be actuated in order to move the latch in and out of the mortis of the plug and by doing so locking and unlocking the plug from the plug inlet. According to some aspects, a first magnet may be mounted on the first side of the lever, and a second magnet, mounted on a divider between the lever and the socket, may be designed to reject the first magnet. The lever may be connected to the plug inlet by an axis (e.g., screw, rod, pin, etc.) such that moving the lever includes turning the lever about the axis.

The normal position of the lever (i.e., when the lever is not being actuated) may be determined according to the rejection force of the magnets, where the rejection force may distance a first side of the lever from the magnet mounted between the lever and the socket. At the normal position, the latch may be positioned in the socket such that if there was a plug plugged in the plug inlet, the latch would be in the mortise of the plug. When the lever is actuated, the magnets may be pushed towards each other, the position of the latch may be moved in the direction away from the center of the socket, such that if there were a plug plugged in the plug inlet, the latch would be removed from the mortise and the plug would be unlocked and would be free to be removed. The click-in latch lock may be designed to allow the plug to be inserted into the plug inlet without pushing down on the lever, and the pushing in of the plug in the socket may push the latch away from the plug in order to let the plug be pushed in. In contrast, the click-in latch lock may prevent the plug from being unplugged without pushing down on the lever and removing the latch from the mortise of the plug.

Actuating the lever may include pressing the lever, pulling the lever, or performing an action in order to affect operation of the lever.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. A more complete understanding of the present disclosure and the advantages thereof may be acquired by referring to the following description in consideration of the accompanying drawings, in which like reference numbers indicate like features.

FIG. 1A-1B illustrate perspective and front views respectively of a plug inlet incorporating a click-in lock, in accordance with one or more aspects of the present disclosure.

FIG. 1C illustrates a cross-sectional side view of a plug inlet incorporating a click-in lock, in accordance with one or more aspects of the present disclosure.

FIG. 1D illustrates a detailed view of a cross-sectional side view of parts of a plug inlet incorporating a click-in lock, in accordance with one or more aspects of the present disclosure.

DETAILED DESCRIPTION

Figure 1E:
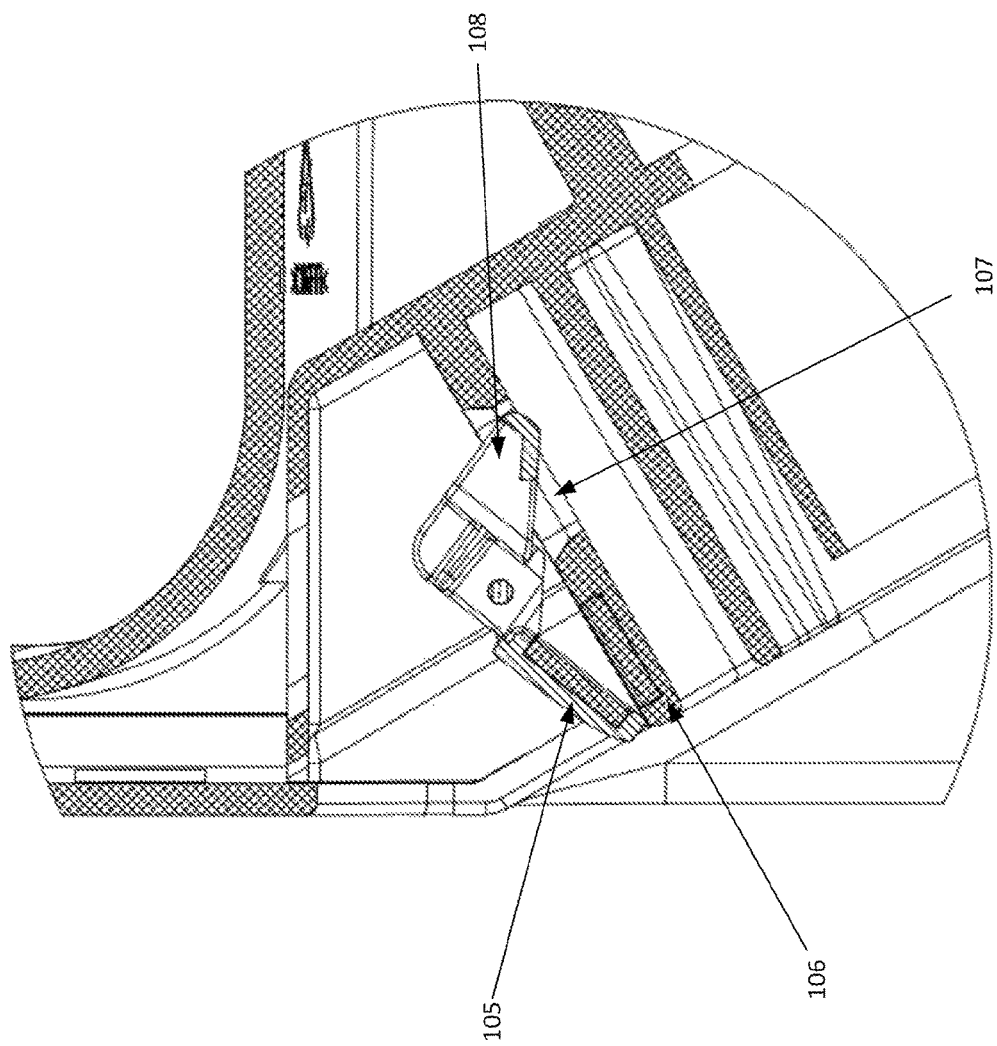
FIG. 1E illustrates another detailed view of a cross-sectional side view of parts of a plug inlet incorporating a click-in lock, in accordance with one or more aspects of the present disclosure.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Reference is now made to FIGS. 1A and 1B, which show a plug inlet 100 featuring a click-in lock 103 according to one or more illustrative embodiments. Plug inlet 100 may include base 101. Base 101 may be designed to be mounted on a surface such as a wall. According to some aspects, plug inlet 100 may be part of an inverter and/or a charger, such as an electric vehicle (EV) charger. According to some aspects, base 101 may be designed to enable storing a cable or an electrical cord by wrapping the cable or electrical cord around base 101. Plug inlet 100 may have a socket 102 designed to house a plug, for example an EV plug. According to some aspects, plug inlet 100 may be grounded, and according to some aspects, socket 102 may be grounded. Grounding plug inlet 100 and/or socket 102 may be useful (or, in some locales, required) for safety reasons. For example, an EV plug may be designed to transfer high currents and/or high voltages, and, plug inlet 100 or socket 102 may be designed to be grounded to prevent a floating (and potentially dangerous) voltage.

According to some aspects, plug inlet 100 or socket 102 may include one or more prong receptacles such as prong receptacles 102a and 102b. According to some aspects, prong receptacles 102a-102b may be electrically connected (e.g., shorted) to each other. Electrically connecting prong receptacles 102a and 102b of plug inlet 100 may provide safety and power savings by preventing or hindering a cable from transferring power by minimizing a voltage difference between two or more prongs of a cable, and as a result, reducing a current in a cable.

According to some aspects, plug inlet 100 may include a click-in lock 103. Click-in lock 103 may be manufactured from a rigid material, such as hard plastic, metal, etc. Click-in lock 103 may be designed to click into a respective plug inserted into socket 102, preventing the respective plug from disconnecting from plug inlet 100 and/or socket 102. According to some aspects, plug inlet 100 may have a niche 104 designed to house click-in lock 103. According to some aspects, niche 104 may be designed so that click-in lock 103 may be pressed on using a finger. According to some aspects (not explicitly shown in FIGS. 1A and 1B), plug inlet 100 might not have a niche designed to house click-in lock 103, rather, click-in lock 103 may be positioned partially on a first side of base 101, side 101a of FIG. 1A and partially on a second side of base 101, side 101b of FIG. 1A, where click-in lock 103 may be designed to be pressed on the first side of base 101. According to some aspects, plug inlet 100 may have multiple sockets, designed to store multiple cables and plugs.

Reference is now made to FIG. 1C, which shows a side cross-sectional view (section 1C-1C of FIG. 1B) of plug inlet 100. Click-in lock 103 may have a lever 105, designed to be actuated. The lever 105 may be disposed in any appropriate position with respect to niche 104. For example, the lever 105 may be at the top, the bottom, either one of the sides, and so forth of the niche 104. According to some aspects, click-in lock 103 may be designed to be in a locked position when lever 105 is in an upper position (as shown in FIGS. 1C and 1D) and unlocked when lever 105 is actuated as shown in FIG. 1E and in proximity to a divider 106. A handle 123 is provided on a second side of the lever. Divider 106 may separate socket 102 and niche 104 (of FIG. 1B). Divider 106 may have a mortise 107. Mortise 107 may be a hole, a cavity or any other opening designed to house a latch. Mortise 107 may be an opening between socket 102 and niche 104. Lever 105 may be connected to a latch 108. Latch 108 may be designed to partially (as shown in FIG. 1C) or fully fit into mortise 107. In a locked position of click-in lock 103, latch 108 may be positioned in mortise 107 (as shown in FIG. 1C), and in an unlocked position of click-in lock 103, latch 108 may be designed to be partially or fully out of mortise 107 as shown in FIG. 1E. According to some aspects, a plug configured to plug into socket 102, may have one or more mortises, designed to click into a click-in lock such as click-in lock 103 by housing latch 108. According to some aspects, plug inlet 100 may have one click-in lock 103 (as shown), and in other aspects, plug inlet 100 may have more than one (e.g., two, three, four, five, or more) click-in locks.

Reference is now made to FIG. 1D, which shows a detailed view (Detail B of FIG. 1C) of a side cross-sectional view of FIG. 1C, focusing on click-in lock 103. Click-in lock 103a may have a lever 105 and a latch 108 as mentioned in reference to FIG. 1C. Latch 108 may be designed to fit into and to be inserted into and removed from mortise 107 of divider 106. Lever 105 may be connected to base 101 of inlet plug 100 (FIG. 1A) by axis 109. Axis 109 may be, for example a pin, hinge, screw etc. Axis 109 may be designed such that lever 105 rotates around axis 109. According to some aspects, a torsion spring (not shown) may be placed between lever 105 and divider 106. The torsion spring may be designed to position lever 105, for example, when no torque is applied to the torsion spring, in a locked position (as shown), meaning that latch 108 is positioned fully or partially in mortise 107. Torque may be applied to the torsion spring by turning lever 105 around axis 109 towards divider 106, and latch 108 may be partially or fully taken out of mortise 107, unlocking click-in lock 103.

According to some aspects, click-in lock 103a may have a first magnet 110, mounted on lever 105, and a second magnet 111, mounted on divider 106. Magnets 110 and 111 may be magnetized in polarizations configured to reject each other. Click-in lock 103a may be designed to be normally locked because of the rejection force between magnets 110 and 111, and lever 105 may be positioned away from divider and latch 108 may be positioned fully or partially in mortise 107 (as shown). Force may be applied to lever 105 rotating lever 105 around axis 109 towards divider 106 and latch 108 partially or fully out of mortise 107.

According to some aspects, one of magnets 110 and 111 may be replaced with a rejecting material such as a metal, configured to reject an opposing magnet. For example, magnet 110 may be replaced with a metal plate configured to reject and be rejected from and by magnet 111. Magnet 111 may be designed to be of a polarity to reject magnet 110 or a metal plate.

According to some aspects, magnets 110 and/or 111 may be electromagnets. An electromagnet may be designed to be magnetized when receiving an electric current higher than a certain threshold, and demagnetized when receiving a current under a certain threshold. According to an aspect of the disclosure, where click-in lock 103*a* is designed using electromagnets for magnets 110 and/or 111, a plug may be designed to be locked when an electric current over a certain threshold is applied to electromagnets 110 and 111, and unlocked when the electric current is under a certain threshold. Plug inlet 100 may include a switch designed to apply or cease a current configured to magnetize or demagnetize electromagnets 110 and 111. The switch may be a mechanical switch (such as a button, a flip-switch etc.), and may be an electrical switch, such as an RFID (radio frequency identification) key, fingerprint key, a keypad key, etc. According to some aspects, plug inlet 100 may include magnets 110 and 111 designed to hold click-in lock 103 in a locked position configured to be unlocked and locked depending on a force applied to click-in lock 103*a*, and may include one or more electromagnets designed to hold click-in lock 103*a* in a locked position preventing the change of position of click-in lock 103*a* when the electromagnets are magnetically coupled.

Figure 1F:
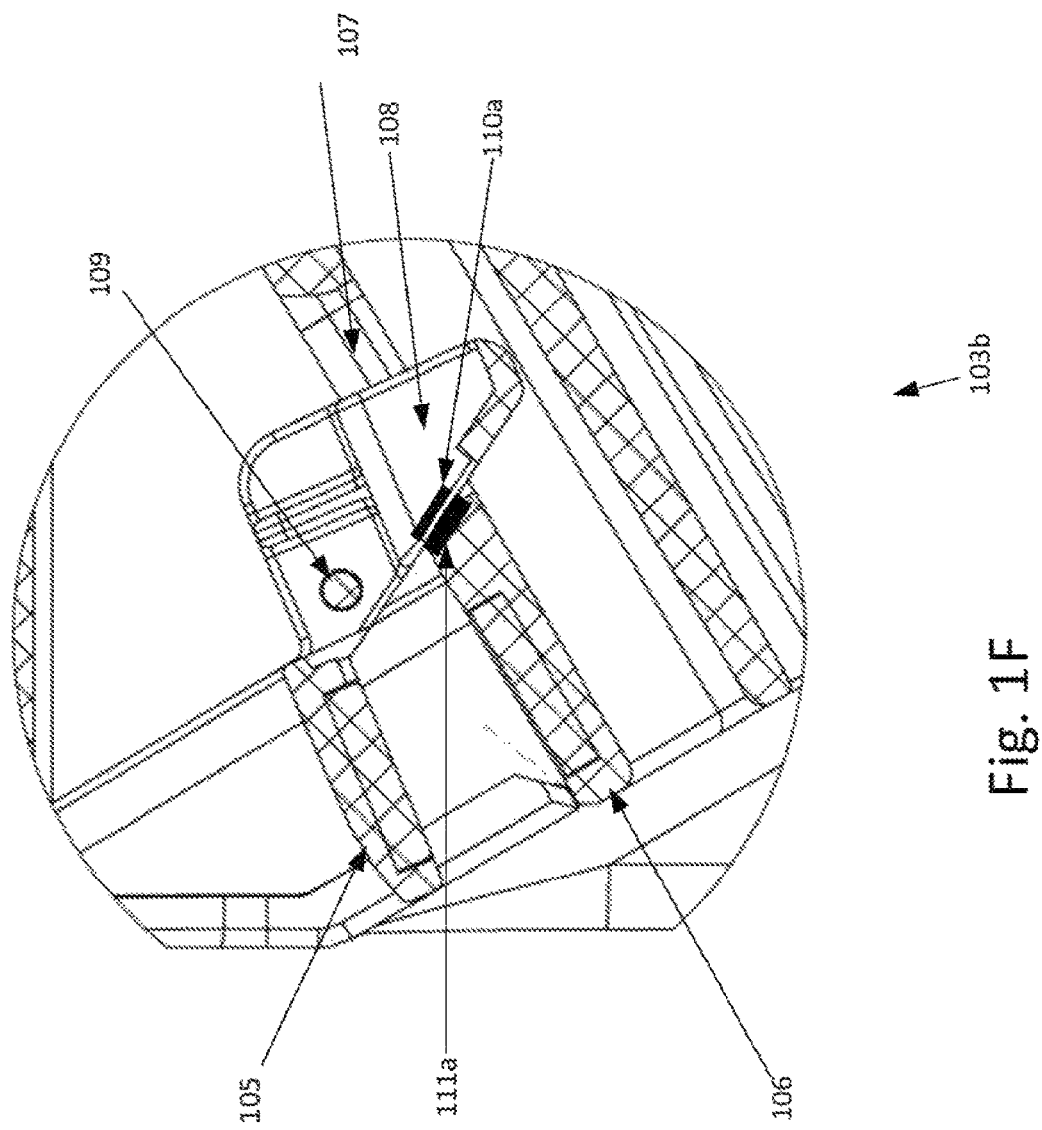
FIG. 1F illustrates another detailed view of a cross-sectional side view of parts of a plug inlet incorporating a click-in lock, in accordance with one or more aspects of the present disclosure.

Reference is now made to FIG. 1F, which shows a detailed view (Detail B of FIG. 1C) of a side cross-sectional view of FIG. 1C, focusing on click-in lock 103*b*. Click-in lock 103*b* may include magnets 110*a* and 111*a*, designed to attract each other. Magnet 111*a* may be mounted on latch 108, and magnet 110*a* may be mounted on divider 106, designed to be in proximity to magnet 111*a* when latch 108 is positioned in mortise 107. A magnetic force may be applied between magnets 111*a* and 110*a*, so that click-in lock may be normally closed. In order to separate magnets 110*a* and 111*a*, a mechanical force may be applied to lever 105. For example, a finger may actuate that lever 105 by pressing down on the lever 105 thereby applying enough force to separate between magnets 110*a* and 111*a*. According to some aspects, magnet 110*a* or magnet 111*a* may be replaced with a metalized area that may be magnetically drawn to magnet 111*a* or magnet 110*a*.

According to some aspects, plug inlet 100 may include a magnetic sensor (not shown) configured to sense a plug designed to plug into plug inlet 100. The magnetic sensor may sense a magnet mounted in and/or on a designated plug. The magnetic sensing may include sensing an angle of the plug in relation to plug inlet 100, the distance of the plug from plug inlet 100, sensing a level of connection between a corresponding plug and plug inlet 100. Sensing a level of connection may include, for example, determining whether or not the plug and plug inlet 100 clicked-in to each other, whether the plug and the plug inlet are touching but not clicked-in, or if the plug and plug inlet are not touching.

Figure 2:
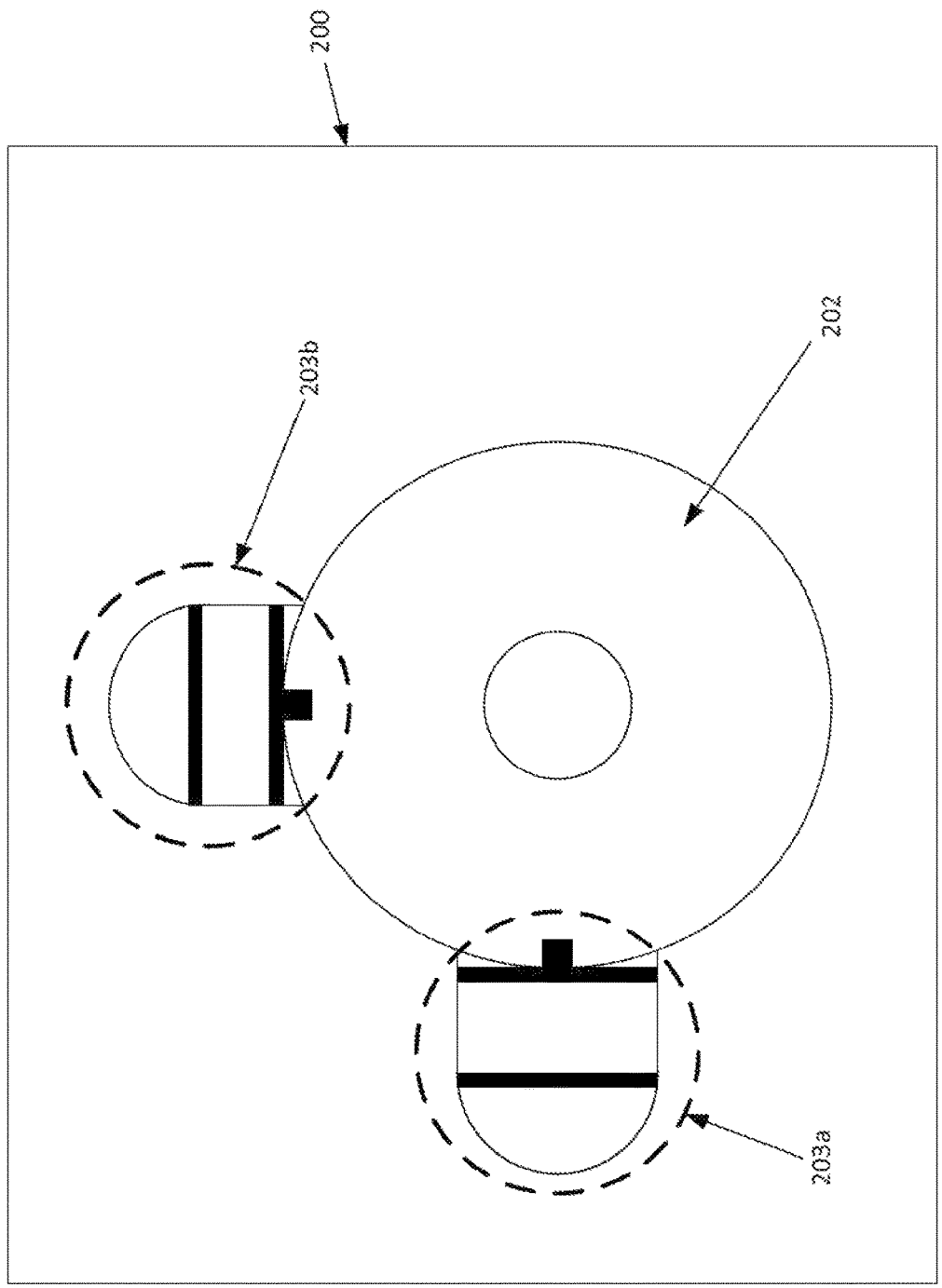
FIG. 2 illustrates a sketch of a plug inlet, including a plurality of click-in locks.

Reference is now made to FIG. 2, which illustrates a plug inlet 200 including a socket 202 and a plurality of click-in locks 203*a*-203*b*. Plug inlet 200 may be designed to house a plug in socket 202, such as plug inlet 100 of FIG. 1A, and may be configured to lock a corresponding plug to plug inlet 200 by click-in locks 203*a* and 203*b*. Click-in locks 203*a*-203*b* may be positioned above, below and/or to a side of socket 202.

Figure 2A:
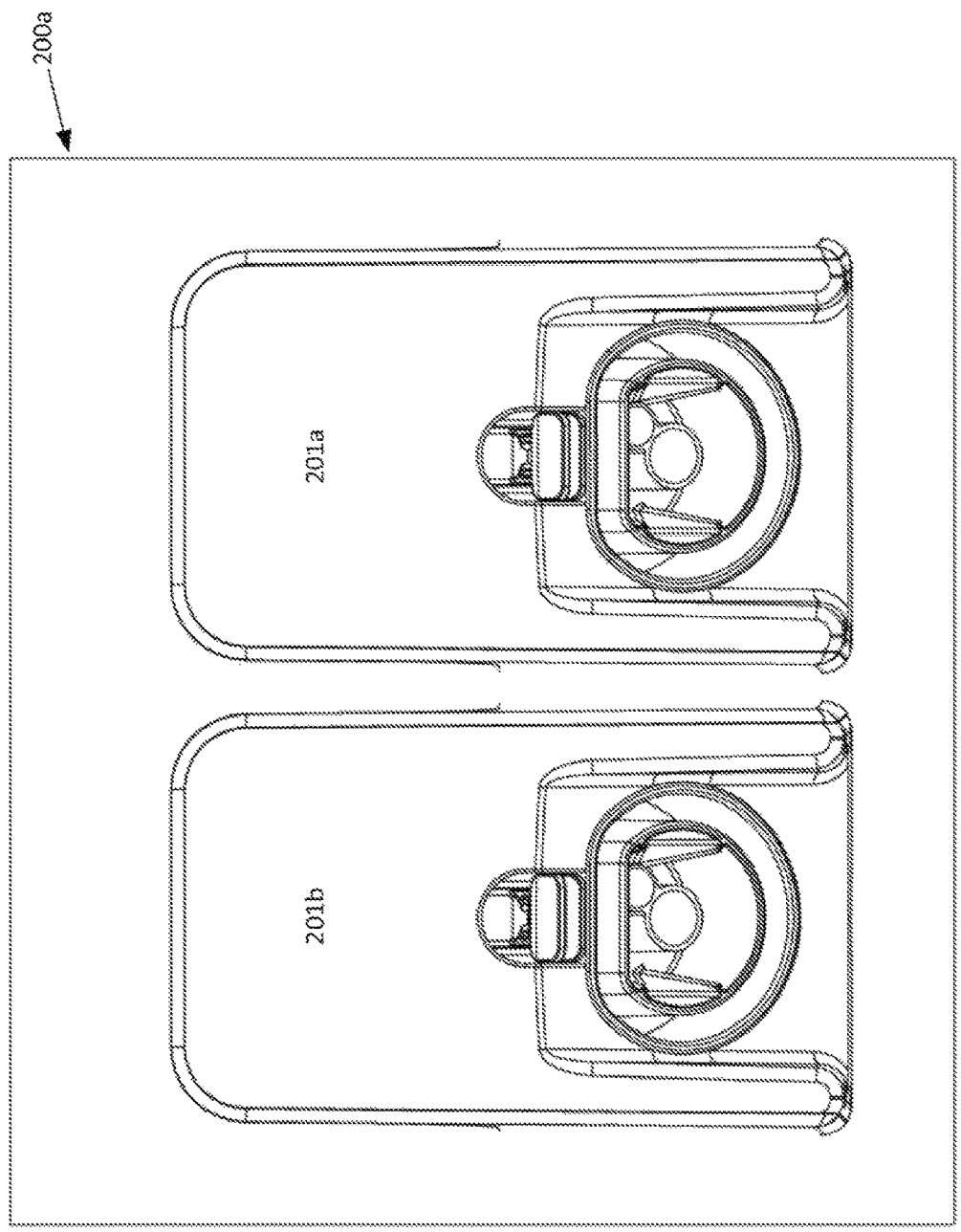
FIG. 2A illustrates a plug inlet with a plurality of sockets, in accordance with one or more aspects of the disclosure.

Reference is now made to FIG. 2A, which shows a plug inlet with a plurality of sockets, according to illustrative embodiments. According to some aspects, plug inlet 200*a* may include one or more sockets, designed to house one or more plugs. For example, plug inlet 200*a* may be designed to house an electrical vehicle plug. Plug inlet 200*a* may be placed in a garage designed to house two vehicles. Plug inlet 200*a* may have more than one socket. For example, plug inlet 200*a* may have a first socket 201*a* designated to hold a charger for one of the vehicles in the garage and a second socket 201*b* for another vehicle in the garage.

Figure 3:
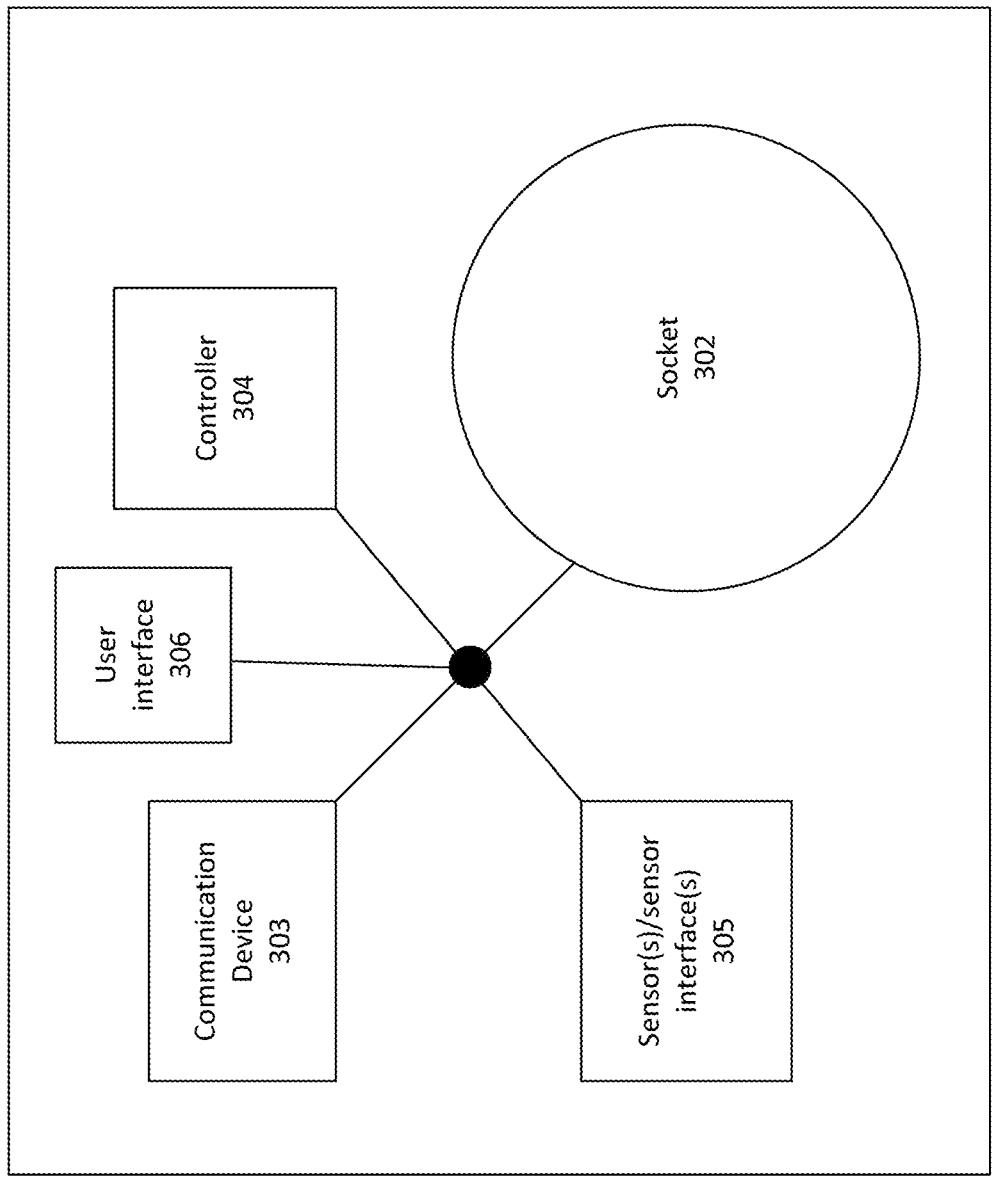
FIG. 3 illustrates a block diagram of a plug inlet, in accordance with one or more aspects of the disclosure.

Reference is now made to FIG. 3, which illustrates a block diagram of a plug inlet 301 according to illustrative embodiments. According to some aspects, plug inlet 301 may include a communication device 303 configured to receive and/or transfer data to a plug designed to plug into socket 302. Communication device 303 may receive and/or transfer data using PLC, wired communication, wireless communication protocols (e.g., Bluetooth™, ZigBee™, WiFi™, etc.), acoustic communication, etc. plug inlet 301*a* may further include a controller 304 (e.g., Digital Signal Processor (DSP), Microcontroller Unit (MCU), Field Programmable Gate Array (FPGA), Application Specific Integrated Circuit (ASIC), analog control circuit, etc.) and a sensor(s)/sensor interface(s) 305. According to some aspects, controller 304 may be designed to activate the locking and unlocking of socket 302. For example, socket 302 may include an electromagnet as mentioned in reference to FIG. 1D. Controller 304 may activate and/or deactivate the electromagnet designed to lock and/or unlock socket 302 depending on data received from communication device 303. For example, communication device 303 may receive a pairing signal from a corresponding plug, controller 304 may receive the pairing signal and deactivate the electromagnet and unlock socket 302.

According to some aspects, sensor(s)/sensor interface(s) 305 may be configured to sense a corresponding plug. Controller 304 may be configured receive a measurement from sensor(s)/sensor interface(s) 305, such as distance, orientation, type etc. of the corresponding plug. User interface 306 may be configured to output the measurement, for example, user interface 306 may beep slowly if sensor(s)/sensor interface(s) 305 senses a plug from a first distance, and beep faster if sensor(s)/sensor interface(s) 305 senses the plug from a second distance closer than the first distance.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another. It is noted that various connections are set forth between elements herein. These connections are described in general and, unless specified otherwise, may be direct or indirect; this specification is not intended to be limiting in this respect. Further, elements of one embodiment may be combined with elements from other embodiments in appropriate combinations or subcombinations.

What is claimed is:

1. An apparatus comprising:
a base comprising:
a first magnet,
a socket configured to receive a plug; and
a lever comprising:
an axis of rotation coupling the lever to the base;
a second magnet, wherein a distance between the first magnet and the second magnet is determined by a repulsion force between the first magnet and the second magnet; and
a latch configured to be inserted into and removed from a mortise of the plug;
wherein when the plug is inserted into the socket, the latch is configured to be pushed aside by the plug, thereby pushing the first magnet and the second magnet towards each other, and wherein when the plug is fully inserted into the socket the latch is configured to enter the mortise thereby locking the plug in the socket.

2. The apparatus of claim 1 wherein one of the first magnet and the second magnet comprises an electromagnet and the other of the first magnet and the second magnet comprises a ferromagnetic material.

3. The apparatus of claim 2 wherein a controller is configured to activate or deactivate the electromagnet.

4. The apparatus of claim 3 wherein activating the electromagnet locks the plug into the socket and wherein deactivating the electromagnet unlocks the plug from the socket.

5. The apparatus of claim 3 wherein activating the electromagnet unlocks the plug from the socket and wherein deactivating the electromagnet locks the plug into the socket.

6. The apparatus of claim 1 wherein the second magnet is positioned on a first end of the lever and wherein the latch is positioned on a second end of the lever.

7. The apparatus of claim 1 wherein the axis of rotation is positioned between the second magnet and the latch.

8. The apparatus of claim 1 wherein the plug comprises an electrical vehicle charging plug.

9. The apparatus of claim 1 wherein the lever comprises a handle configured receive a force applied to the handle, and wherein the force is configured to push the first magnet and the second magnet towards each other.

10. A method comprising:
plugging a plug into a socket of a base, wherein the plugging includes pushing the plug into the socket at least up to a point that a latch of a lever is inserted into a mortise of the plug, thereby locking the plug in place, wherein the lever is coupled to the base by an axis of rotation;
receiving a wireless signal, by a controller, to unlock the plug; and
releasing, by the controller, the latch from the mortise and unlocking the plug from the socket, thereby allowing removal of the plug from the socket.

11. The method of claim 10 further comprising a locking mechanism, wherein the releasing comprises activating or deactivating the locking mechanism, and wherein the lever comprises a magnet mounted on a first end of the lever and wherein the latch is positioned on a second end of the lever.

12. The method of claim 11 wherein the releasing comprises activating or deactivating an electromagnet, and wherein the locking mechanism comprises the electromagnet.

13. The method of claim 10 wherein the plug corresponds to an electrical vehicle charging plug.

14. A system comprising:
a plug comprising a mortise;
a plug inlet, the plug inlet comprising:
a base comprising:
a first magnet,
a socket configured to receive the plug; and
a lever comprising:
an axis of rotation coupling the lever to the base;
a second magnet, wherein a distance between the first magnet and the second magnet is determined by a repulsion force between the first magnet and the second magnet; and
a latch configured to be inserted into and removed from the mortise;
wherein when the plug is inserted into the socket, the latch is configured to be pushed aside by the plug, thereby pushing the first magnet and the second magnet towards each other, and wherein when the plug is fully inserted into the socket the latch is configured to enter the mortise thereby locking the plug in the socket.

15. The system of claim 14 wherein one of the first magnet and the second magnet comprises an electromagnet and the other of the first magnet and the second magnet comprises a ferromagnetic material, and wherein a controller configured to activate or deactivate the electromagnet.

16. The system of claim 15 wherein activating the electromagnet locks the plug into the socket and wherein deactivating the electromagnet unlocks the plug from the socket.

17. The system of claim 15 wherein activating the electromagnet unlocks the plug from the socket and wherein deactivating the electromagnet locks the plug into the socket.

18. The system of claim 14 wherein the plug inlet comprises a magnetic sensor in communication with a controller configured to detect the location of the plug in relation to the plug inlet based on signals received from the magnetic sensor.

19. The system of claim 18 wherein the controller is configured to detect the spatial orientation of the plug in relation to the plug inlet based on signals received from the magnetic sensor.

20. The system of claim 14 wherein the second magnet is mounted on a first end of the lever and wherein the latch is positioned on a second end of the lever.

* * * * *